United States Patent [19]

Delyea

[11] Patent Number: 5,027,907
[45] Date of Patent: Jul. 2, 1991

[54] REPLACEMENT TIPS FOR SPRING HARROWS

[76] Inventor: Garth Delyea, Box 1504, Assiniboia, Saskatchewan, Canada, S0H 0B0

[21] Appl. No.: 500,202

[22] Filed: Mar. 28, 1990

[51] Int. Cl.$^5$ ............................................. A01B 23/02
[52] U.S. Cl. .................................. 172/707; 172/719; 172/772.5; 403/284; 403/306; 403/362
[58] Field of Search ............... 172/681, 705, 707, 708, 172/719, 745, 772, 772.5; 403/284, 287, 301, 305, 306, 362; 29/14

[56] References Cited

U.S. PATENT DOCUMENTS

| 156,836 | 11/1874 | Baltzer | 29/14 X |
|---|---|---|---|
| 247,658 | 9/1881 | King | 172/772 |
| 249,518 | 11/1881 | Griffith | 29/14 |
| 257,237 | 5/1882 | Nellis | 172/707 |
| 274,684 | 3/1883 | Wells | 172/708 X |
| 301,094 | 7/1884 | Chapin et al. | 172/708 |
| 350,050 | 9/1886 | Freasier | 403/306 X |
| 492,283 | 2/1893 | Gladney et al. | 172/772 |
| 747,112 | 12/1903 | Allen, Jr. | 172/772 X |
| 1,241,094 | 9/1917 | Conard | 29/14 |
| 1,807,998 | 6/1931 | McCord | 172/703 |
| 1,856,706 | 5/1932 | Holcomb | 172/772 X |
| 2,895,559 | 7/1959 | Toland | 172/762 |
| 2,970,374 | 2/1961 | Kamarovsky | 29/471.1 |
| 3,157,019 | 11/1964 | Brackbill | 172/705 X |
| 4,342,366 | 8/1982 | Schenk et al. | 172/707 X |
| 4,786,106 | 11/1988 | Bottemiller | 403/362 |
| 4,834,190 | 5/1989 | Kyle | 172/730 X |

FOREIGN PATENT DOCUMENTS

| 449079 | 6/1948 | Canada . | |
|---|---|---|---|
| 751156 | 1/1967 | Canada . | |
| 911799 | 10/1972 | Canada . | |
| 1076873 | 5/1980 | Canada . | |
| 1143209 | 3/1983 | Canada . | |
| 1150560 | 7/1983 | Canada . | |
| 1197129 | 11/1985 | Canada . | |
| 39371 | 10/1928 | Denmark | 172/708 |
| 2352262 | 6/1975 | Fed. Rep. of Germany | 172/708 |
| 2104362 | 3/1983 | United Kingdom | 172/719 |

OTHER PUBLICATIONS

"Bolt on Harrow Replacement Tips", Farm Show Magazine, vol. 13, No. 5, Sep. 1989, Garth Delyea-Inventor.

*Primary Examiner*—David H. Corbin
*Assistant Examiner*—Jeffrey L. Thompson
*Attorney, Agent, or Firm*—Adrian D. Battison; Stanley G. Ade; Murray E. Thrift

[57] ABSTRACT

The invention is designed primarily for use with resilient tine components which include a pair of resilient spring coils having an attaching U extending between adjacent ends and a resilient tine extending from the outer end of each of the resilient coils substantially perpendicular to the longitudinal axis thereof. These often wear and the most expensive replacement cost is the resilient spring coils. The present invention overcomes these disadvantages by provided a sleeve which engages over the worn ends of the tines and is secured thereto and which has a replacement tine portion secured within the other end of the tubes and extending axially therefrom thus returning the tines to their original length. The sleeves can be secured to the worn ends of the tines either by welding, set screws or other means.

1 Claim, 2 Drawing Sheets

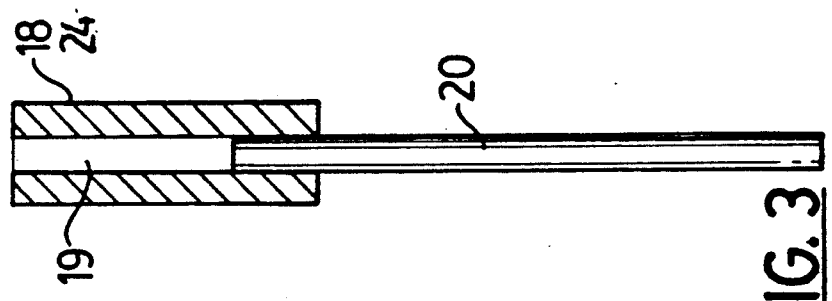
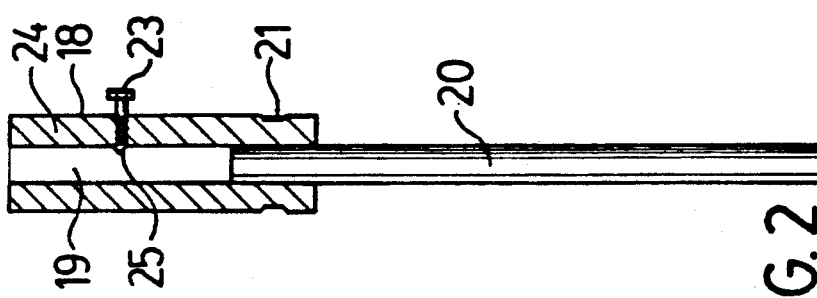
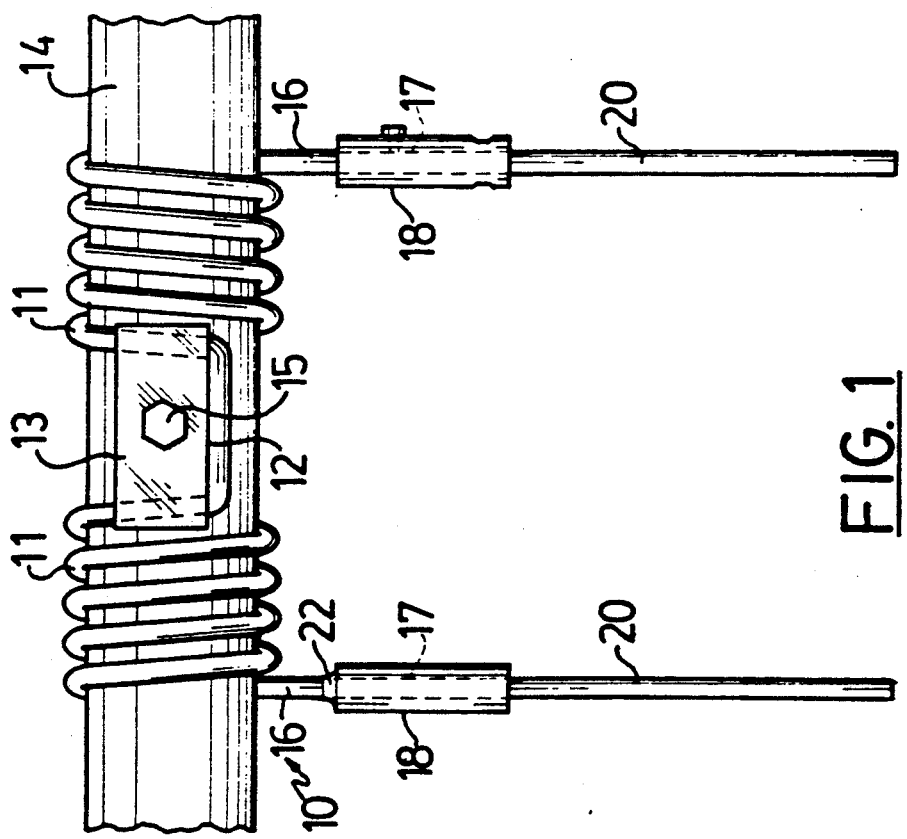

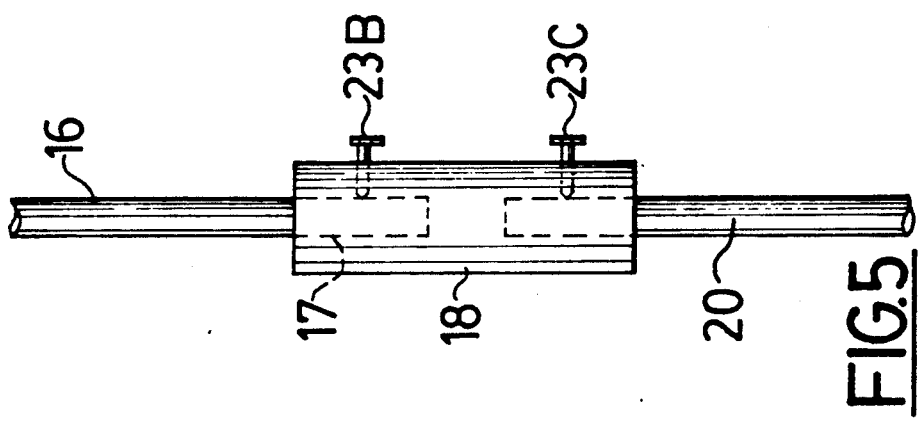
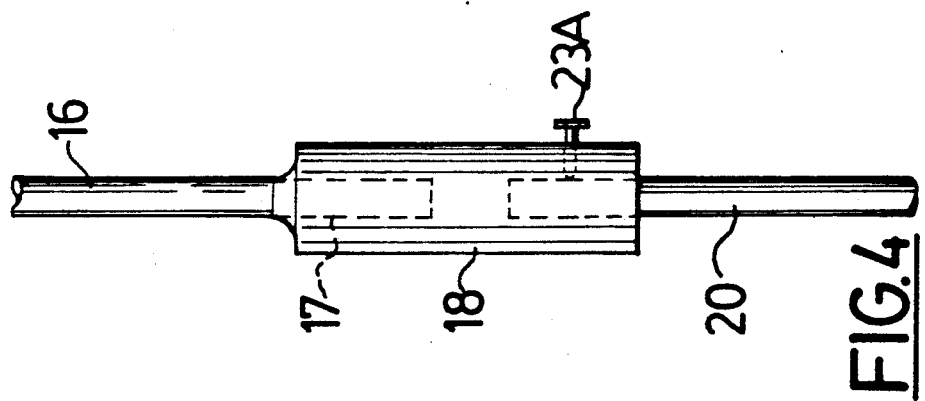

REPLACEMENT TIPS FOR SPRING HARROWS

This invention relates to new and useful improvements in harrow tines, particularly double harrow tines which consist of a one piece double coiled spring having a U-shaped attaching yolk therebetween and a resilient tine extending from the other end of each of the springs in substantially parallel relationship one with the other.

These are usually bolted to a cross beam of a harrow assembly and tend to wear rather rapidly particularly when used under abrasive conditions.

Inasmuch as the major cost of such assemblies is the double coiled spring portion thereof, it will be appreciated that replacement of a complete set of tines is a relatively expensive matter.

PRIOR ART

The following prior art is known to applicant.

Canadian Patents 449,079, June 15, 1948, Thomas Gray. This shows a socketed replaceable harrow point in which the fixed male portion is recessed to receive the female or replaceable point portion which is held in place by a pair of opposed wing lugs engaging into corresponding recesses in the male portion.

751,156, Jan. 24, 1967, E. C. Tronn. This shows a replaceable point for spring cultivator teeth which is riveted onto the front side of the main tooth.

911,799, Oct. 10, 1972, R. I. Hawkins. This shows a replaceable blade for a duck foot chisel type cultivator.

1,076,873, May 6, 1980, J. W. Ryan. This shows a removable or replaceable digging point for a plow shank which includes an adapter for engaging the blade portion to releasably secure same to the shank and includes a forwardly tapering recess to receive an end of the shank to which the blade portion is attached.

1,143,209, Mar. 22, 1983, R. E. Lindqvist. This shows a self-balanced cultivating device for plows in which the digging point is bolted to the front of the support.

1,150,560, July 26, 1983, D. C. Schenk. This shows a soil mulcher but without any replaceable digging points.

1,197,129, Nov. 26, 1985, F. Hegemann et al. This shows cultivator spring type teeth with the lower portion of the spring together with the permanently attached tooth is bolted to the lower end of the curved upper portion of the spring.

U.S. Patents

U.S. Pat. No. 156,836, Nov. 17, 1874, C. H. Baltzer. This shows a mold type plow with an attachable ground engaging portion secured to the front lower side thereof.

U.S. Pat. No. 247,658, Sept. 27, 1881, J. K. King. This shows a cultivator shovel having a supporting plate secured to the rear side thereof adjacent the ground engaging point.

U.S. Pat. No. 249,518, Nov. 15, 1881, J. Griffith. This shows a method of welding steel points to cast iron plows.

U.S. Pat. No. 492,283, Feb. 21, 1893, J. R. Gladney et al. This shows a method of securing flat ground engaging plates to the standard of a plow.

U.S. Pat. No. 747,112, Dec. 15, 1903, B. Allen. This shows a similar construction to the previous patent in which the ground engaging plate is secured to the lower end of the plow standard.

U.S. Pat. No. 1,241,094, Sept. 15, 1977, C. J. Conard. This shows a method of renewing worn out plow points which shows a plow point which can be repointed or replaced by welding.

U.S. Pat. No. 1,807,998, June 2, 1931, J. I. McCord. This shows a reversible self-sharpening chisel plow or point therefore.

U.S. Pat. No. 1,856,706, May 3, 1932, M. D. Holcomb. This shows a method of attaching a cutter blade to the back plate of a spacer.

U.S. Pat. No. 2,895,559, July 21, 1959, W. G. Toland. This shows a sleeve type replaceable cultivator point.

U.S. Pat. No. 2,970,374, Feb. 7, 1961, S. Kamarovsky. This shows a method of manufacturing peg type harrow tooth assemblies and securing same.

The present invention overcomes this prime disadvantage of conventional tine assemblies by providing means to return the worn tine portions to their original length still utilizing the remainder of the tine assembly, particularly the double coiled spring portion thereof.

In accordance with the invention there is provided a replacement tip assembly for spring type harrow tines comprising in combination a sleeve engageable over the free end of a resilient tine, a replacement tine tip engageable within one end of said sleeve and extending axially therefrom, means to secure said replacement tip assembly to the associated free end whereby said tip assembly extends axially from the associated tine and means to secure said replacement tine tip to said sleeve.

In accordance with another aspect of the invention there is provided, in a spring tine assembly which includes a pair of coiled spring portions connected together by attaching means therebetween and a resilient tine extending from the outer end of each of said coil spring portions substantially perpendicular to the longitudinal axis of said springs; a replacement tip assembly for said resilient tines, each replacement tip assembly comprising in combination a sleeve engageable over the free end of each of said resilient tines, a replacement tine tip engageable within one end of each of said sleeves and extending axially therefrom, means to secure each of said replacement tip assemblies to the associated free end whereby said tine tip assembly extends axially from the associated tine, and means to secure said replacement tine tip to said sleeve.

In a still further aspect of the invention there is provided the combination of a spring tine assembly which includes a pair of coiled spring portions having connecting mean extending between adjacent ends thereof and a resilient tine extending from the outer end of each of said coil spring portions and perpendicular to the longitudinal axis thereof, a replacement tip assembly for each of said resilient tines, each said replacement tip assembly including a sleeve engageable over the free end of a resilient tine, a replacement tine tip engageable within one end of each of said sleeves and extending axially therefrom, means to secure said replacement tine tip assembly to the associated free ends whereby said tine tip assembly extends axially from said associated tines, and means to secure said replacement tine tip to said sleeve assembly.

One of the principal advantages of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a front elevation of a double spring tine component having a replacement tip assembly on each worn tine;

FIG. 2 is a vertical cross section of one embodiment of the invention;

FIG. 3 is a vertical cross section of a still further embodiment of the invention.

FIG. 4 is a vertical cross section of a still further embodiment of the invention.

FIG. 5 is a vertical cross section of a still further embodiment of the invention.

In the drawings like characters of reference indicate corresponding parts in the different figures.

DETAILED DESCRIPTION

Proceeding therefore to describe the invention in detail, reference should first be made to FIG. 1 which shows a conventional tine assembly collectively designated 10 and which includes two coil spring portions 11 extending one upon each side of a U-shaped yolk 12 and including the square clip 13 which engages over the yolk and holds the tine assembly to a supporting bar 14 by means of a central bolt 15.

Extending from the outer end of each of said coil springs 11, is a resilient tine 16 which is usually circular in cross section, the two legs or tines 16 extending substantially perpendicular to the longitudinal axis of the springs and in spaced and parallel relationship one with the other.

In this particular embodiment, the distal or free ends 17 of the two tines 1 6 are shown as being worn off approximately half way along the length thereof and instead of replacing the entire assembly, my replacement tip assembly is shown in place.

There are several embodiments of the tip assembly illustrated and dealing first with the embodiment shown in FIG. 3, a length of tubing 18 is shown having an internal diameter 19 just slightly larger than the diameter of the tine portions 16 so that the tube will slide snugly onto the worn ends 17 thereof. A replacement tine length or tip 20 is swaged or otherwise secured as by welding, brazing or the like, within the lower end 21 of the tube 18 and extends part way along the length of the tube. The major portion of the tube slideably engages over the worn tine end 17 and may be welded as indicated by reference character 22, to the tine as shown on the left hand leg of FIG. 1.

One of the preferred embodiments is shown in FIG. 2 and on the right hand leg of FIG. 1, which again includes a tube 18 having a central bore 19 of a similar diameter to the bore of the tube in FIG. 3. Once again the replacement tine length or tip 20 is swaged or otherwise secured as by welding, brazing or the like, within the lower end 21 of the tube and the major portion of the tube is then slideably engaged over the worn end 17 of the tine leg 16 as shown on the right hand side of FIG. 1. A set screw 23 threadably engages a screw threaded aperture within the wall 24 of the tube 18 and may be provided with a pointed end 25 which bites into or engages a small drilling within the wall of the tine 16 as it is tightened thus holding the tube and tine tip 20 firmly in position upon the tine 16. Alternatively a hardened edge sharpened concavity in the end of the set screw may be used, such set screws are conventional.

From the foregoing it will be appreciated that the life of the tine assembly 10 may be extended indefinitely simply by providing replacement tip assemblies as the previous ones become worn.

Alternatively, the tine assembly 10 may be manufactured with relatively short legs 16 and the tine tip assemblies constituting the present invention may be installed as original manufacture thus enabling easy replacement as the extending ends of the tine legs 16 will not become worn or roughened or bent during use which might make it difficult to install the replacement tip assemblies.

FIGS. 4 and 5 show alternative embodiments to FIG. 2. FIG. 4 shows a reverse construction of FIG. 2 in which the tube 18 is in engaged over the end 17 of the tine leg 16 and then is welded to leg 16 so that replacement tines 20 may be replaced as they become worn merely by loosening the set screw 23(a) which is situated adjacent the lower or free end of the tube 18. This means that once the tube 18 has been purchased and installed either by welding, brazing, swaging or any other conventional means, it is only necessary to purchase the replacement tine portions 20. This is particularly suitable for use in original manufacture as mentioned above.

The embodiment shown in FIG. 5 shows the tube 18 with set screws 23(b) and 23(c) being used firstly to secure the tube to the lower end 17 of the tine 16 and secondly to hold the replacement tine 20 in position.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A spring tine assembly comprising an integral wire element coiled to form a pair of coiled spring portions, coiled about a common longitudinal axis to form adjacent axially spaced ends and outer ends of the spring portions with connecting means extending between said adjacent ends thereof and a first and a second resilient tine portion each extending from and integral with an outer end of a respective one of said coil spring portions such that the tine portion extends in a direction perpendicular to the longitudinal axis, the tine portion comprising a cylindrical tine body of circular cross section, a lower end of which is worn by contact with the ground, and a first and a second replacement tip assembly each mounted on a respective one of said resilient tine portions, each said replacement tip assembly including a sleeve defining a longitudinal cylindrical bore extending through said sleeve and opening at opposed ends of the sleeve, said worn end of the respective tine portions being inserted within said bore at one end of the sleeve as a close sliding fit therein, a replacement tine tip engaged within an opposed end of the bore of said sleeve and extending axially as a close sliding fit therein, said replacement tine tip being cylindrical and having a circular cross section equal to that of the worn portion such that an upper end of the tine tip directly abuts said worn end, and means securing said replacement tine tip to said sleeve and said worn lower end to said sleeve.

* * * * *